H. F. GLEASON.
SHORT TURN VEHICLE.
APPLICATION FILED AUG. 8, 1907.
915,344.
Patented Mar. 16, 1909.
2 SHEETS—SHEET 2.
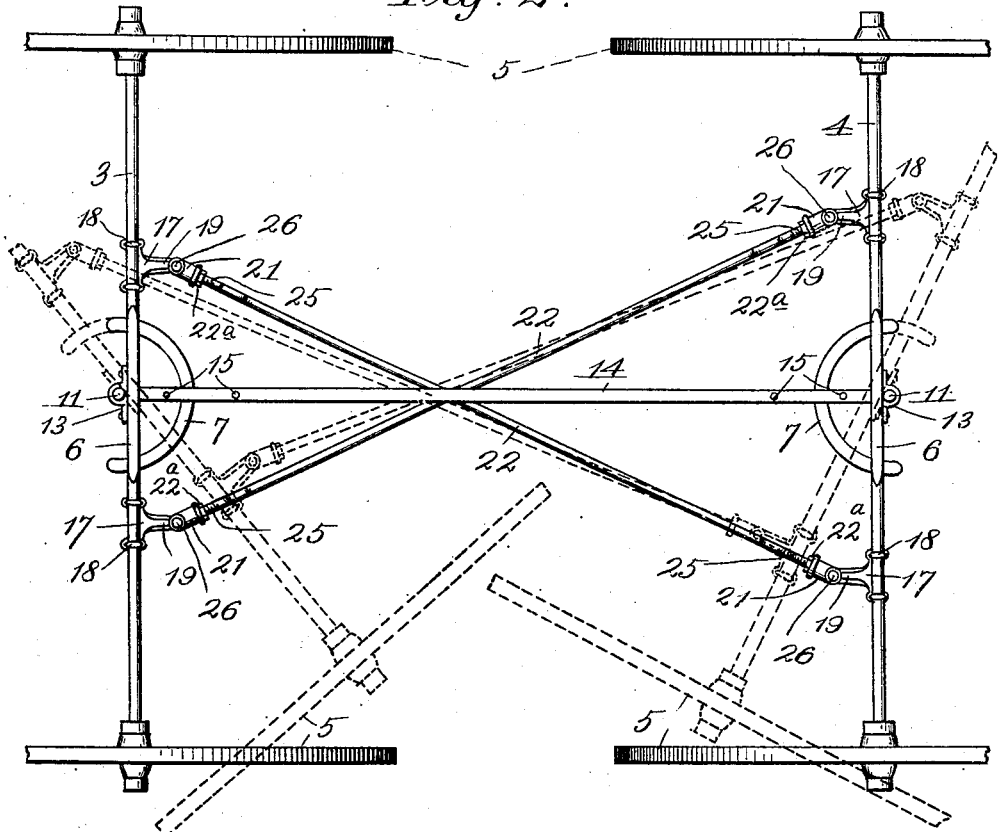
Witnesses:
R. E. Hamilton
M. Cox
Inventor,
H. F. Gleason
By F. G. Fischer
Atty.

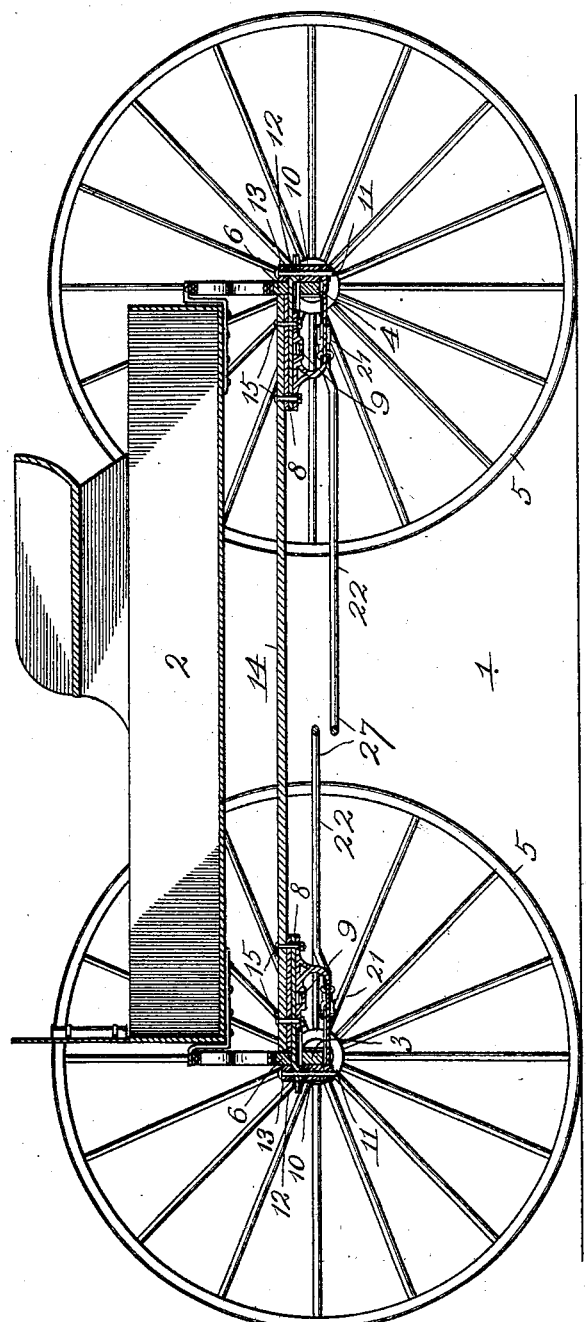

ated March 16, 1909.

UNITED STATES PATENT OFFICE.

HARRISON F. GLEASON, OF KANSAS CITY, MISSOURI, ASSIGNOR TO KANSAS CITY VEHICLE CO., OF KANSAS CITY, KANSAS, A CORPORATION OF MISSOURI.

SHORT-TURN VEHICLE.

No. 915,344.  Specification of Letters Patent.  Patented March 16, 1909.

Application filed August 8, 1907. Serial No. 387,611.

*To all whom it may concern:*

Be it known that I, HARRISON F. GLEASON, a citizen of the United States, residing at Kansas City, in the county of Jackson and State of Missouri, have invented certain new and useful Improvements in Short-Turn Vehicles, of which the following is a specification.

My invention relates to short turn vehicles, or those in which both the front and rear axles turn upon pivots, and the invention pertains more particularly to simple means for simultaneously turning the axles without varying the distance between the pivotal points.

Heretofore, in all short turn vehicles employing cross-reaches to turn the axles upon their pivots, it has been impossible to use a rigid central reach for the reason that the distance between the pivotal points varied more or less when the axles turned. This variation was due to the manner in which the cross-reaches were connected to the axles. I have discovered that this variation may be overcome by locating the pivotal points of the cross-reaches in certain relation to the pivotal points of the axles, hence, I am enabled to employ a rigid central reach whereby the stability of the running gear is greatly increased.

In order that the invention may be fully understood reference will now be made to the accompanying drawings, in which:

Figure 1 represents a vertical central section of a vehicle provided with my improvements. Fig. 2 is a plan view of the running gear, showing the pivotal action of the axles by dotted lines. Fig. 3 is a plan view of a coupling employed in carrying out the invention. Figs. 4 and 5 are broken details of the cross-reaches and their adjustable members whereby they are connected to the coupling.

1 designates a vehicle, which in the present instance, consists of a body portion 2, front and rear axles 3 and 4, respectively, wheels 5 mounted upon the axles, and head-blocks 6 secured to the upper central portion of said axles.

7 designates a pair of fifth-wheels, the upper members 8 of which are secured to head blocks 6, while their lower members 9 are secured upon and turn with the axles, which latter are provided at their outer faces with bearings 10, to receive the king-bolts 11 forming the pivotal points of the axles. King-bolts 11 are carried by extensions 12 on members 8, and extend through bearings 13 secured to the outer faces of the head-blocks.

14 designates a rigid reach abutting at its ends against the head-blocks, and rigidly secured to the upper members of the fifth-wheels by bolts 15.

17 designates a coupling, two of which are secured to each axle by clips 18, and provided with extensions 19 terminating in perforated bosses 20, to which adjustable members 21 are pivotally secured. Members 21 are adjustably secured to the ends of a pair of cross-reaches 22, so that the latter may be so adjusted as to make the front and rear wheels of the vehicle track when traveling in a straight line. After members 21 have been properly adjusted they are locked upon the reaches by lock-nuts 22$^a$. Each member 21 consists of a pair of perforated jaws 23, and an internally threaded sleeve 24, which latter adjustably engages the threaded end 25 of its respective reach. Jaws 23 engage the upper and lower surfaces of boss 20 to which it is pivotally secured by a removable pin 26. The cross-reaches are bent in opposite directions, as indicated by the numeral 27, so they will not contact with each other when one of the wheels of the vehicle pass over an obstacle.

In the modified form, Fig. 5, the cross reach 22$^c$ is constructed of wood instead of iron. Each end of the reach is provided with a casting 28 secured thereto by bolts 29, terminating at one end in an internally threaded sleeve 30 for the reception of a threaded extension 24$^a$ on the rear end of the adjustable member 21$^a$, which like member 21, has a pair of perforated jaws 23$^a$ that engage the upper and lower surfaces of boss 20. The wooden reach 22$^c$ is reinforced throughout its length by a metallic strap 31 through which bolts 29 extend, the ends of the strap being further secured by the clenched ends of studs 32, integral with sleeve 30.

The pivotal points 11 and 26 are arranged predetermined distances apart so that said distances will not vary irrespective of the angles to which the axles may be adjusted, hence it is possible to employ the rigid reach 14 and thereby greatly increase the stability of the running gear.

Having thus described my invention, what I claim is:—

In combination with a reach having a front and rear axle pivotally connected thereto, a pair of crossed reaches, a pair of couplings connected to each axle on opposite sides of the pivotal points thereof, an inward extension carried by each coupling perforated at the inner end thereof, and means to adjustably secure said crossed reaches to said couplings consisting of a series of members having threaded engagement with the ends of said crossed reaches at one end and having a pair of perforated spaced jaws at the opposite ends thereof to receive said extension therebetween, and a pin removably passed through said perforation of said extension and through said perforations of the jaw whereby said pin may be removed and said member rotated to adjust the member axially with respect to said crossed reaches.

In testimony whereof I affix my signature, in the presence of two witnesses.

HARRISON F. GLEASON.

Witnesses:
   F. G. FISCHER,
   M. COX.